July 3, 1928.
C. O. MARSHALL
WEIGHING SCALE MECHANISM
Filed Feb. 14, 1923　　　4 Sheets-Sheet 1
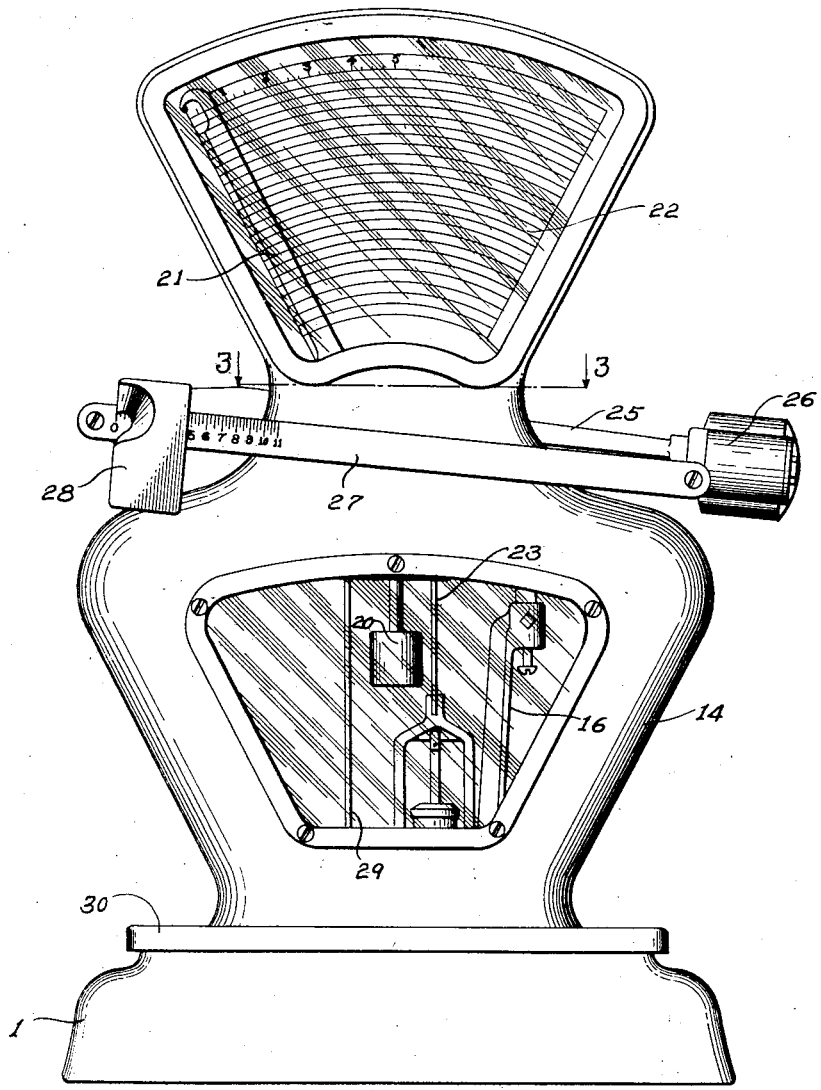
Fig. I.
Inventor
Charles O. Marshall July 3, 1928.  1,675,944
C. O. MARSHALL
WEIGHING SCALE MECHANISM
Filed Feb. 14, 1923   4 Sheets-Sheet 2
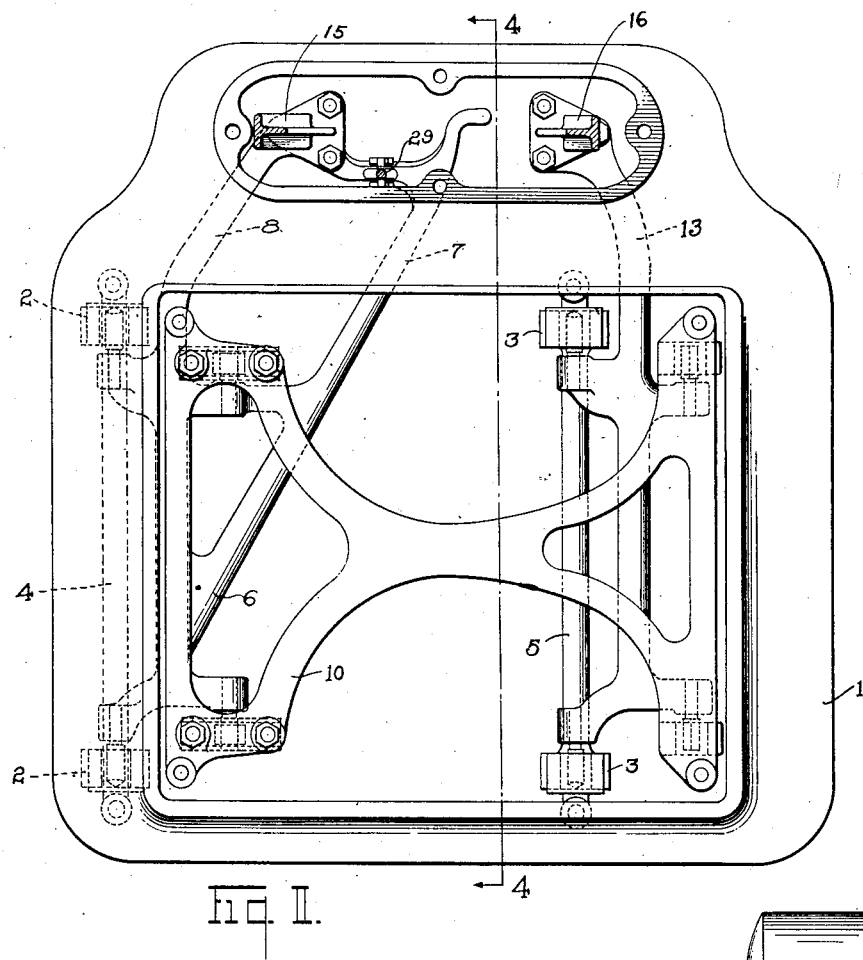
Fig. II.
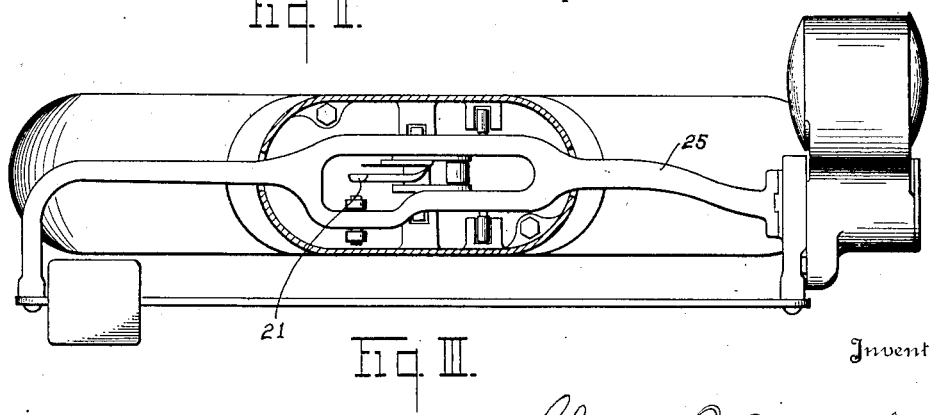
Fig. III.
Inventor
Charles O. Marshall

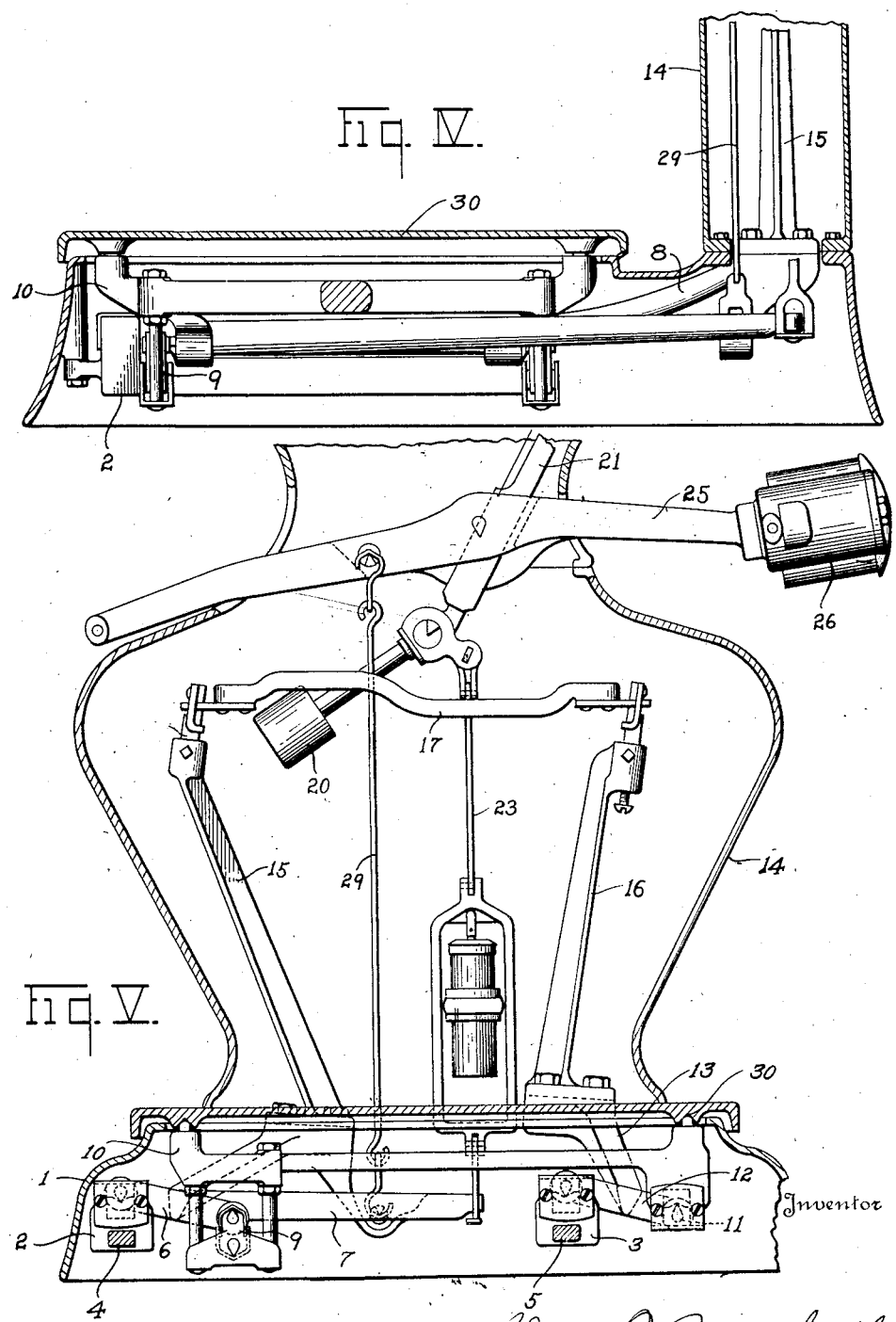

July 3, 1928. 1,675,944
C. O. MARSHALL
WEIGHING SCALE MECHANISM
Filed Feb. 14, 1923 4 Sheets-Sheet 4
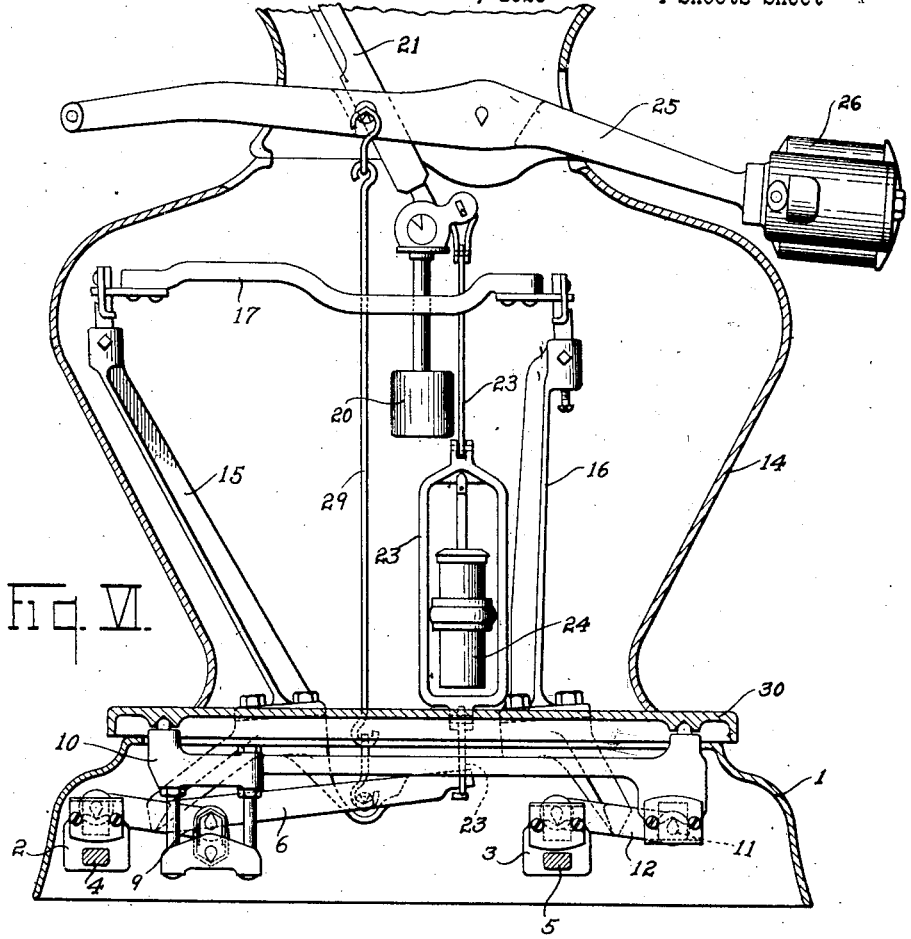
Fig. VI.
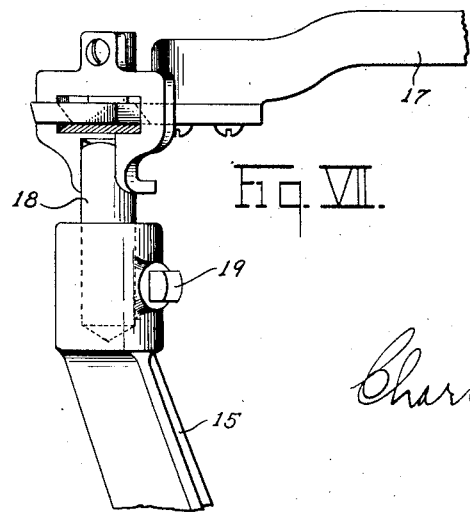
Fig. VII.
Inventor
Charles O. Marshall Patented July 3, 1928.

1,675,944

UNITED STATES PATENT OFFICE.

CHARLES O. MARSHALL, OF TOLEDO, OHIO, ASSIGNOR TO TOLEDO SCALE COMPANY, OF TOLEDO, OHIO, A CORPORATION OF NEW JERSEY.

WEIGHING-SCALE MECHANISM.

Application filed February 14, 1923. Serial No. 618,902.

This invention relates to weighing scales, and one of its principal objects is the provision of a scale in which the levers of the platform lever mechanism all swing in the same direction.

Another object is the provision of a scale having a plurality of platform levers which swing in the same direction, the platform supporting pivots remaining the same distance apart throughout the entire range of movement of the platform levers.

Another object is the provision of an automatic scale having an indicator which faces the platform, in which the axes of movement of the levers of the platform lever mechanism and the axes of movement of the levers of the load-counterbalancing mechanism are parallel.

Another object of the invention is to provide means for pivotally connecting the platform levers of a weighing scale in which the pressure on the connecting pivots is comparatively slight.

Another object of the invention is the provision of an automatic scale having the commodity-receiving platter supported adjacent its edges, the multiplication of the platform levers being comparatively low so that a comparatively heavy automatic counterbalance may be employed.

Another object is the provision of an automatic scale having a comparatively low platform which is maintained in the same condition of level throughout all weighing movements without the use of check links.

Another object is the provision of a weighing scale having a platform supported by a plurality of so-called knee levers, the vertically extending arms of the levers being located within an upright housing at one side of the platform.

Other objects and advantages will be apparent from the following description, in which reference is had to the accompanying drawings illustrating a preferred embodiment of my invention and wherein similar reference numerals designate similar parts throughout the several views.

In the drawings:—

Figure I is a front elevational view of a scale embodying my invention;

Figure II is a plan view of the base, showing the platform levers;

Figure III is a sectional plan view of an upright housing forming part of the scale taken substantially on the line III—III of Figure I;

Figure IV is a sectional side elevational view taken substantially on the line IV—IV of Figure II;

Figure V is a fragmentary front elevational view with the upright housing, base and platform in section and the levers in the position they assume under a full load;

Figure VI is a similar view with the levers in the position that they assume under no load; and Figure VII is an enlarged fragmentary perspective view showing a pivoted connection employed in the scale of my invention.

Referring to the drawings in detail, the base 1 of the scale contains the platform levers which are supported on fulcrum brackets 2 and 3 secured within the base 1, each pair of fulcrum brackets being connected together by means of bars 4 and 5 for the purpose of securing great rigidity. Fulcrumed upon the brackets 2 which are located at the extreme left side of the base is a lever 6 having arms 7 and 8 which extend to the right and rearwardly to points beneath an opening in the top of the base 1. The load pivots of the lever 6 are located beneath a large opening in the top of the base housing in position to receive links 9 upon which is supported one side of a platform spider 10, the other side of the spider being supported on load pivots 11 of a lever 12 which is supported upon the fulcrum brackets 3. The lever 12 has an arm 13 which projects rearwardly to a point beneath the first-mentioned opening in the top of the base 1 and corresponds in function to the arm 8 of the lever 6.

Surmounting the base 1 above the said first-mentioned opening is an upright housing 14 which supports the load-counterbalancing mechanism of the scale.

Secured respectively upon the arms 8 and 13 and extending upwardly into the housing 14 are standards 15 and 16, their upper ends being pivotally connected by means of a link 17 which is of such length that the distance between the pivots by which its ends are connected to the standards 15 and 16 is the same as the distance between the fulcrum pivots of the levers 6 and 12 and the distance between the load pivots of the levers 6 and 12. The pivotal connections at the ends of the link 17 are constructed in the manner shown in Figure VII, so that friction at these points is reduced to a minimum, and the height of each pivot above the fulcrum pivot of the corresponding lever may be adjusted by moving the post 18 upwardly or downwardly and fixing it in place by means of the set screw 19.

Pivotally supported within the upright housing 14 is a load-counterbalancing pendulum 20 having an indicating hand 21 which co-operates with a computing chart 22 of well known form located in the upper end of the housing 14 and visible through transparent windows therein. The pendulum 20 is connected to a nose pivot on the arm 7 of the lever 6 by means of links 23, a dash pot 24 being also connected to the links 23 to damp the movements of the weighing mechanism.

Pivotally supported by the upright housing 14 is a tare beam lever 25 having upon its end an adjustable loading box 26 of sufficient weight to substantially counterbalance the weight of the platform levers and the parts supported thereby. A tare beam 27 and a tare poise 28 are secured to the tare beam lever 25 in the usual way. The lever 25 is connected to the platform lever 6 by means of a rod 29.

When a load is placed upon the commodity-receiving platform 30 which overlies the platform spider 10, the levers 6 and 12 are swung about their fulcrum pivots in a clockwise direction, the movement of the lever 6 exerting a downward pull on the links 23 and thus causing the pendulum 20 to swing upwardly and to the left until the load on the platform is counterbalanced. If the load is placed near the left side of the platform, most of the force acting to raise the pendulum 20 will be transmitted only through the lever 6. Owing to the weight of the platform, platform spider and the lever 12, the link 17 is, however, always in tension, and when the lever 6, which is normally held in elevated position by the counterweight on the tare beam 25, is forced downwardly, the lever 12 by the movement of the standard 15 to the right to swing downwardly to the same extent. If the load be placed upon the right side of the platform 30, the lever 12 is forced downwardly, swinging the standard 16 to the right and acting through the link 17 to swing the standard 15 to the right, thus causing the lever 6 to swing downwardly and creating a pull on the links 23. Both sides of the platform thus move downwardly to the same extent, regardless of the position of the load. If the load be placed in the center of the platform, it acts in part directly through the lever 6 upon the pendulum and in part through the lever 12 and the link 17. When it is desired to weigh a load beyond the capacity of the pendulum 20, the poise 28 may be moved to the right to counterbalance a part or all of the load.

While it will be apparent that the illustrated embodiment of my invention herein disclosed is well calculated to adequately fulfill the objects primarily stated, it is to be understood that the invention is susceptible to modification, variation and change within the spirit and scope of the subjoined claims.

Having described my invention, I claim:

1. In a weighing scale, in combination, a base, an upwardly extending housing at one side of said base, a pair of levers supported by said base, and means within said housing for connecting said levers to cause them to move through equal arcs in the same direction.

2. In a weighing scale, in combination, a base, an upwardly extending housing at one side of said base, a pair of levers supported by said base, an arm fixed to each lever and extending upwardly into said housing, and means connecting said arms to cause said levers to move through equal arcs in the same direction.

3. In a weighing scale, in combination, a base, an upwardly extending housing at one side of said base, a pair of levers supported by said base, each of said levers having a load pivot, a commodity-receiver supported on the load pivots of said lever, and means within said housing connecting said levers for maintaining the load pivots the same distance apart and at the same relative level throughout weighing movements of the scale.

4. In a weighing scale, in combination, a base, an upwardly extending housing at one side of said base, a pair of levers supported by said base, each of said levers having a load pivot, a commodity-receiver supported on said load pivots, an arm fixed to each said lever and extending upwardly within said housing, and means connecting said arms to maintain the load pivots of said levers the same distance apart and at the same relative level throughout weighing movements of the scale.

5. In a weighing scale, in combination, a base, an upright frame at one side of said base, a pair of levers supported by said base, an arm fixed to each said lever and extending upwardly within said frame, means connecting said arm to cause said levers to move through equal arcs in the same direction, a pendulum supported by said frame to swing on an axis parallel to the axes of movement of said levers, and means connecting said pendulum and said levers.

6. In a weighing scale, in combination, a base, an upright frame at one side of said base, a pair of levers supported by said base, an arm fixed to each of said levers and extending upwardly within said frame, a pendulum supported by said frame to swing on an axis parallel to the axes of movement of said levers, one of said levers having a nose lying beneath said pendulum, and a substantially vertical connection between said pendulum and said nose.

7. In a weighing scale, in combination, a base, a housing at one side of said base, a pair of platform levers supported by said base, a beam lever supported by said housing to swing on an axis parallel to the axes of movement of said platform levers, an arm fixed to each of said platform levers and extending upwardly within said frame, and means connecting said arms to cause said levers to move through equal arcs in the same direction.

8. In a weighing scale, in combination, a base, an upright frame at one side of said base, a pair of platform levers supported by said base, each of said platform levers having a load pivot, an arm fixed to each of said levers and extending upwardly within said frame, means connecting said arms to maintain said load pivots the same distance apart and at the same relative level during weighing movements of said levers, a pendulum supported by said frame to swing on an axis parallel to the axis of movement of said levers, one of said levers having a nose lying beneath said pendulum, a substantially vertical connection from said pendulum to said nose, a tare beam lever supported by said frame to swing on an axis parallel to the axis of movement of said pendulum and the axes of movement of the first said levers, and means connecting the first said levers and said tare beam lever.

9. In a weighing scale, in combination, a base, a housing at the rear side of said base, a pair of platform levers supported by said base, a commodity-receiver carried by said platform levers, an arm on each of said platform levers extending upwardly within said housing, means connecting said arms to cause said platform levers to move through equal arcs in the same direction, a pendulum supported within said housing to swing on an axis parallel to the axes of movement of said platform levers, one of said platform levers having a nose lying beneath said pendulum, a substantially vertical connection from said pendulum to said nose, a chart supported by said housing and facing said commodity-receiver, and an index fixed to said pendulum and adapted to co-operate with said chart in indicating the weight of the load on said commodity-receiver.

10. In a weighing scale, in combination, a base, an upright housing at the rear side of said base, platform levers supported by said base, a commodity-receiver carried by said platform levers, an arm fixed to each of said platform levers and extending upwardly within said housing, means connecting said arms to cause said platform levers to move through equal arcs in the same direction, a pendulum supported within said housing and adapted to swing on an axis parallel to the axes of movement of said platform levers, a chart supported by said housing and facing said commodity-receiver, an index fixed to said pendulum and adapted to swing over said chart, a beam lever supported by said housing to swing on an axis parallel to the axes of movement of said platform levers and said pendulum, and a connection between said beam lever and said platform levers.

CHARLES O. MARSHALL.